INVENTORS
GLENN F. KREBS &
BY GEORGE J. CROWDES
Richard MacCutcheon
ATTORNEY

Aug. 10, 1965  G. F. KREBS ETAL  3,200,302
SIGNAL PROGRAMMED TIME DELAY
Filed Dec. 19, 1962  3 Sheets-Sheet 2

INVENTORS
GLENN F. KREBS &
BY GEORGE J. CROWDES

ATTORNEY

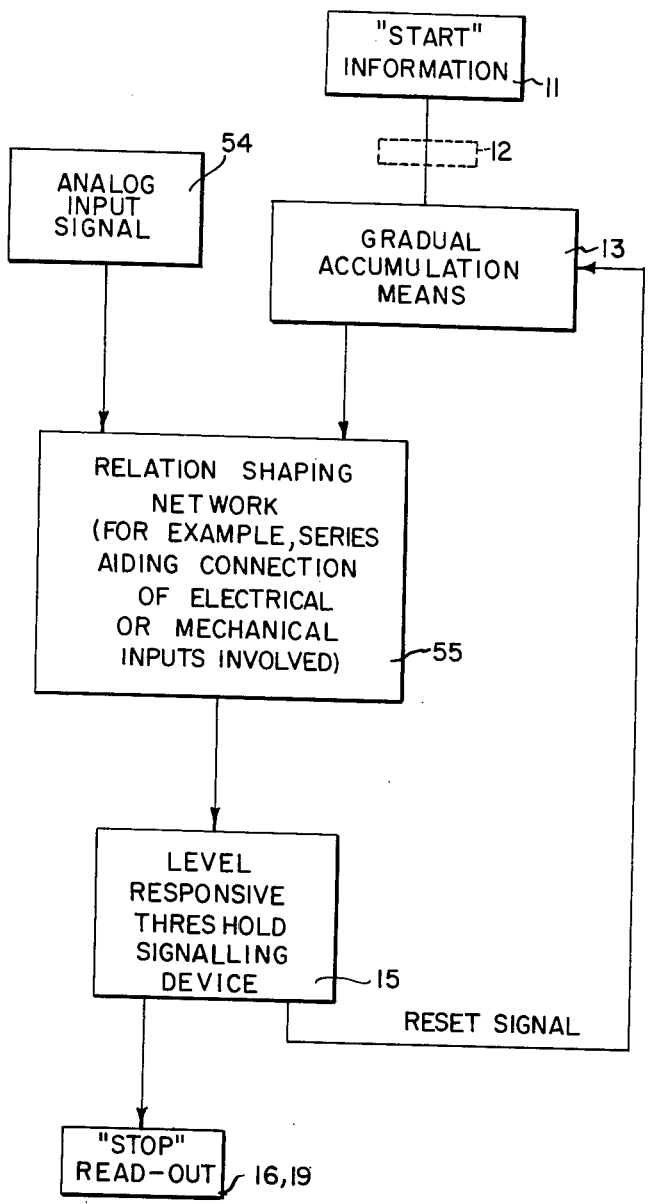

United States Patent Office 3,200,302
Patented Aug. 10, 1965

3,200,302
SIGNAL PROGRAMMED TIME DELAY
Glenn F. Krebs, Bratenahl, and George J. Crowdes, Chesterland, Ohio, assignors, by mesne assignments, to API Instruments Company, Chesterland, Ohio, a corporation of Ohio
Filed Dec. 19, 1962, Ser. No. 245,905
4 Claims. (Cl. 317—141)

Our invention is a time delay device, the delay period of which may be programmed by an electrical signal.

A commonly used article of commerce is the time delay relay, of which many different designs are available. Basically, all such designs function to abruptly cause a circuit alteration a specific length of time after a "start" signal is received, the length of time either being fixed, or adjustable over a range of time periods as by manipulation of an adjustable component.

In many cases it is desirable to use an electrical signal to adjust the delay period of the time delay device. Most available devices which meet this requirement are relatively complex, expensive, and inflexible as regards adaptation to differing input signal types and differing ranges.

It is an object of the present invention to provide simple and inexpensive means for overcoming the above mentioned difficulties.

Other objects and advantages will become apparent and the invention may be better understood from consideration of the following description taken in conjunction with the accompanying drawings, in which:

FIG. 7 is a block diagram showing modifications.

Figure 1:
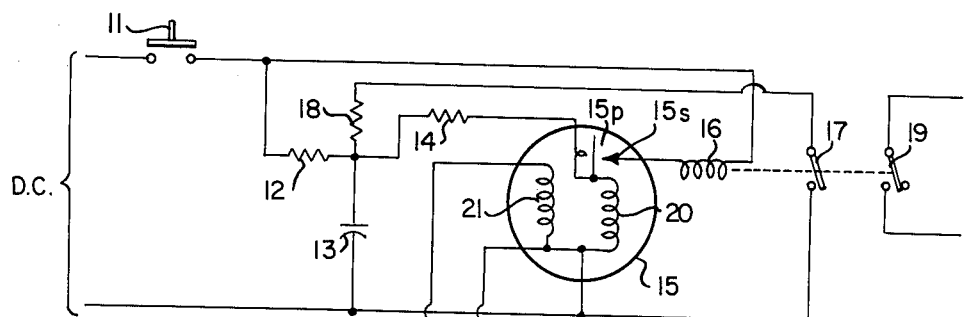
FIG. 1 is a schematic diagram illustrating general principles of the present invention.

In FIG. 1 a direct current power supply provides current through a normally open push button switch 11 and through a charging resistor 12 to begin charging a capacitor 13. Voltage across capacitor 13 is read, through a current limiting resistor 14, by the voltage reading (and locking) coil winding 20 of a meter relay 15. Such a meter having contacts, a locking (booster) coil and another (signal) coil is described in various issued patents including 2,576,371 to Thompson and Hammond.

The closing of push button 11 additionally provides a circuit to a load relay coil 16 "arming" the meter relay relatively stationary adjustable contact 15$_s$. When the voltage across capacitor 13 has built up (due to charge accumulated in the capacitor) and moved the meter pointer having a movable contact 15$_p$ into engagement with the stationary contact, current flows through relay coil 16, closing its associated contact 17 which discharges capacitor 13 through a current limiting resistor 18 thus readying the circuit for another delay cycle. The current flowing through relay coil 16 passing through the locking and voltage reading coil 20 presses the meter relay contacts firmly (and preferably wipingly) together for reliable behavior. The other (signal) winding 21 on the moving structure of meter relay 15 is connected to read an applied signal current whose value adjusts the time delay period.

In operation, current from the constant voltage power supply charges the capacitor 13 while current flows through meter relay winding 20 in such sense as to tend to discharge the capacitor, or at least slow its charging rate. With zero applied signal current flowing in winding 21 torque provided by the voltage reading winding 20 must proceed from zero volts (the value immediately before switch 11 is pressed) to that "threshold" value of voltage corresponding to pointer position at which contact 15$_s$ has been placed, such as, for example, fifty volts. Assuming, by way of illustration, that windings 20 and 21 have equal resistances and numbers of turns, if the signal current applied to winding 21 is to be equal to that in winding 20 and corresponds to twenty-five volts, when the switch 11 is first pressed, the moving contact would already be positioned half way to the stationary contact. As a result, when the capacitor 13 has taken the time required to charge from zero to only twenty-five volts, the meter contacts close, completing the cycle. Thus the application of signal current reduces the voltage to which capacitor 13 must charge before the threshold is reached and the cycle completed.

Figure 2:
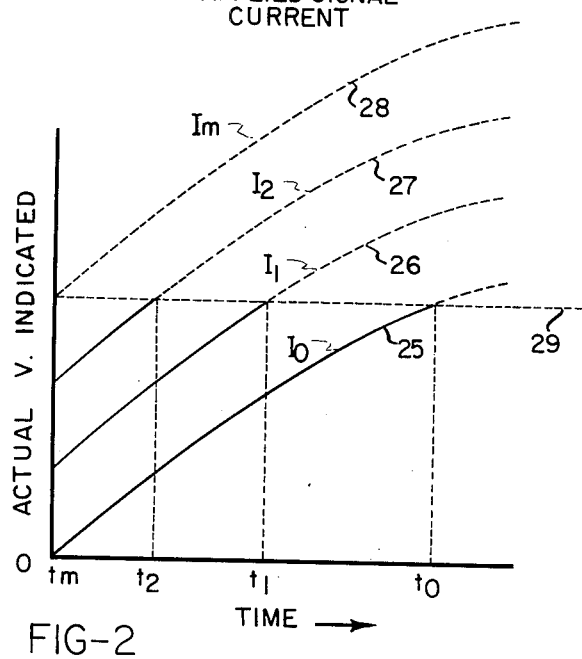
FIG. 2 is a graph showing relations between time, meter relay pointer indication, and applied (control) signal current.

In FIG. 2, curve 25 shows that with no applied signal current ($I_0$) provided in 21, the signal pointer of meter relay 15 moves from one end of the scale (zero indicated volts) all the way to wherever the contact set point (threshold) is set. This position is equivalent to a certain indicated voltage 29, but contact 15$_s$ is only "relatively" stationary usually being mounted on a manually adjustable "set" pointer, not shown but quite conventional in the art. If, instead of I being zero, it is $I_1$, the pointer begins the delay cycle at some value above zero volts meter pointer position, and moves upscale, as shown in FIG. 2 by the $I_1$ curve marked 26. Because the distance to be traveled to set point 29 is less, the voltage sensed by the voltage sensing coil 20 needs only to increase to a lesser value than for $I_0$ before the pointer has been given sufficient torque to cause contact mating, so the time period required for this to transpire has been reduced from the longer time period $t_0$ for $I_0$ to $t_1$ for $I_1$. Similarly, for a higher applied signal current $I_2$, the time required for the contacts to mate is further reduced as shown by the curve 27. Finally, when the applied signal current is $I_m$, when switch 11 is pressed the moving pointer already rests against the relatively stationary contact, and the time delay period $T_m$ is essentialy zero as seen in FIG. 2, 29 being a horizontal line representing the manually adjusted set point above which the trajectory curves are shown dashed because the voltage indicated positions would not in fact exist. However the threshold can be set up (or down) and may, for example, be set at the highest on-scale position.

Figure 3:
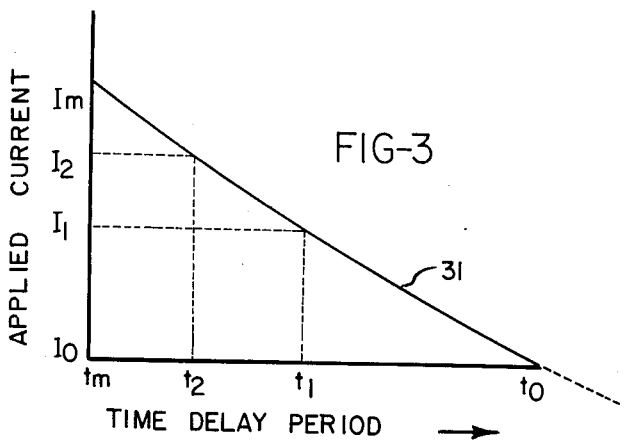
FIG. 3 is a graph showing output characteristics, and for this purpose relating applied signal current to time delay period.

In FIG. 3 "output characteristics" are depicted, the relationship shown being that between time delay period and applied signal current. Because the trajectories in FIG. 2 are not straight lines, the curve 31 of FIG. 3 is also curved. By proper adjustment of various parts of our invention the degree of continuous function non-linearity can be adjusted from nearly non-linear to extremely non-linear as explained hereinafter. In general, the higher the supply voltage, and the larger the value of a resistance placed as is resistor 12 in FIG. 1, and the higher the sensitivity of voltage sensing coil 20, the closer will linearity be approached in output characteristics.

Figure 4:
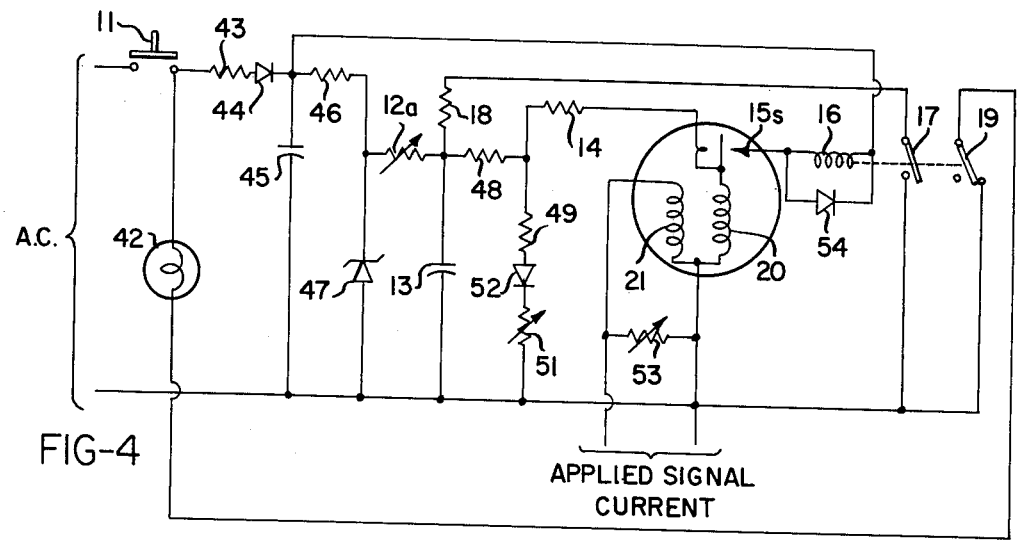
FIG. 4 is a schematic diagram of an embodiment having refinements and details suiting it for a particular, and common, application.

FIG. 4 shows an embodiment which includes refinements suitable, for example, for automatic control of exposure time in projection enlargement of photographs, or in supplementing conventional procedures for making non-enlarged prints from either negatives or positives.

In FIG. 4, A.C. power derived from push button 11 energizes an enlarger projection lamp 42 through normally closed contacts 19 associated with load relay coil 16. Additionally, when 11 is depressed, through a current limiting resistor 43, D.C. is provided by a rectifier 44 and a filter capacitor 45. Like parts are like numbered in FIGS. 1 and 4, and the D.C. supply arms relay coil 16 and meter relay contact $15_s$. In FIG. 4 a load resistor 46 is used and a Zener diode 47 will, as is well known to those familiar with the art, provide regulated voltage to the timing circuit. The charging rate of capacitor 13 is adjusted by a variable resistor 12a. Capacitor 13 is discharged at the end of the cycle through limiting resistor 18 by normally open contact 17 actuated by relay coil 16 as in FIG. 1. Additional resistors 48 and 49 and an adjustable resistor 51 regulate the operation of a forward conduction diode 52 in a delinearizing circuit, a refinement whose operation is explained hereinafter. The "adjusted" voltage across capacitor 13 is read by meter relay winding 20 through resistor 14. Signal coil 21 sensitivity adjustment is provided by an adjustable shunt resistor 53 and in the embodiment shown a meter contact protection diode 54 is connected across relay coil 16.

In operation of the arrangement of FIG. 4, when switch 11 is held closed the lamp 42 remains lit through the time delay period, that is until coil 16 is energized and opens the normally closed contact 19 to extinguish the lamp. A characteristic of the forward conduction diode 52 (e.g., a crystal rectifier) is that forward conduction current increases very slowly as voltage to the diode is increased, until a "break-over" voltage is exceeded, after which the current increases rapidly until finally its change is approximately linear with respect to applied voltage change. In connection with FIG. 4 use is made of this phenomenon as follows: as capacitor 13 charges, the voltage observed by meter coil 20 and by diode 52 rises. So long as this voltage is below "break-over" the diode represents a high resistance through which only negligible current will flow. However, as the voltage rises the diode begins to appreciably conduct. Because resistor 12a limits current flow into the capacitor, the rate of voltage rise drops as the diode 52 begins to conduct current out of capacitor 13, the pointer trajectory slope for $I_0$ (see FIG. 2) flattens, and more time (than if diode 52 were absent) is required to move the signal pointer to the contact meter threshold (set point). The abruptness in degree of trajectory slope change is governed primarily by how much current can be led away through the diode 52. This is practically entirely governed by the size of resistances 48, 49 and 51, since the diode forward resistance will be very low after break-over voltage is exceeded.

Figure 5:
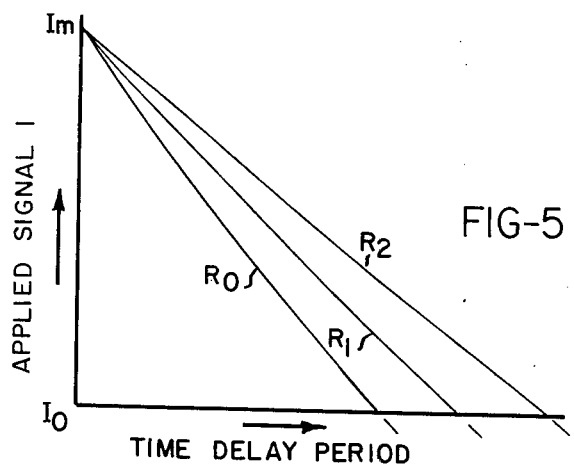
FIG. 5 is a graph showing effect of varying one group of adjustments.

FIG. 5 shows the effect on output characteristics of varying the setting of charge rate adjustment variable resistor 12a. The curves shown are based on the assumption that meter relay threshold (set point) is constant, that resistor 51 is set to a relatively high and constant value to make the effect of the delinearizing circuit negligible, and adjustable resistor 53 is left at a constant setting. The effect of increasing the value of resistor 12a from some minimum value $R_0$ to successively higher values $R_1$ and $R_2$ is to increase the time delay period for any given applied signal current value. It will be noted that as resistance value is increased, the relation between applied signal current and time become slightly more linear.

The relationship between photographic exposures and developed image density is logarithmic rather than linear, as is well known. In other words, obtaining double density from a given light source requires more than mere doubling of the time of exposure. So far as the present invention is concerned, this means that the nearly linear characteristics shown in FIGS. 2, 3 and 5 are not suitable. If a photoelectric cell is used to apply signal current to an arrangement as in FIG. 1 it could provide correct exposure (that is, voltage supply for lamp 42 of FIG. 4) only for a negative having some standard density. A higher density of negative (or other original) would cut down the light and thus supply lower signal current and the device would respond with longer exposure time, but the time would be only approximately linearly iincreased and an underexposed reproduction would result. For this reason delinearization is required, and in the FIG. 4 embodiment where signal coil 21 can derive its signal from a negative density sensing photocell, the continuous function delinearization is provided by resistors 48, 49 and 51 in combination with diode 52.

Figure 6:
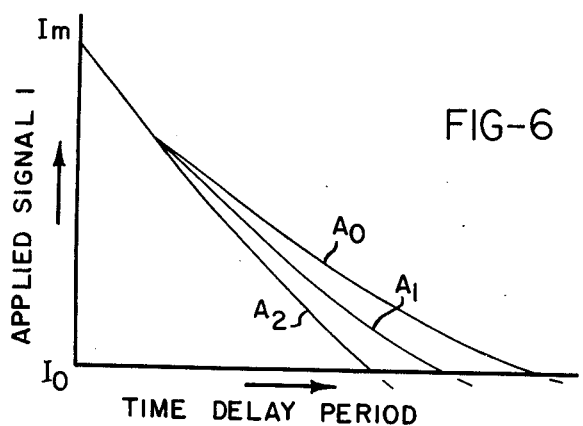
FIG. 6 is a graph showing effect of varying another group of adjustments.

In FIG. 6 curve $A_2$ represents the output characteristics with high values of resistance in series with diode 52, and is essentially the same as a selected curve from the family of curves in FIG. 5. However, with a somewhat lowered resistance value (in practice obtained by adjustment of 51) a curve such as $A_1$ is obtained. With a still lower resistance setting of 51, a curve such as that marked $A_0$ may be obtained. Consequently, the non-linearity achieved can permit a change from $I_0$ (as described in FIG. 2) to $I_1$ to make a vastly greater reduction in exposure time than a change from $I_1$ to $I_2$, if desired.

If, for a given application, either greater linearity than that indicated in FIGS. 3, 5 and 6 is required, or a certain non-linearity (which curves the characteristics either more or less in the direction shown or in the opposite direction) is desired, similar circuitry can be inserted in the applied signal current connections in addition to, or instead of, the capacitor charge sensing connections described in connection with FIG. 4.

In FIG. 7, various parts or sub-assemblies are labeled by function and like functioning parts are numbered as before. Thus through a "start" input means (e.g., a push button) 11, and as through a charging impedance (resistor) 12, a gradual accumulation or storage means 13 is fed from a supply. Ultimately the storage means operates the threshold signaling device 15 which while preferably a meter relay could be another sort of multicoil relay, or could be a thyratron, or a transistor, a Zener diode or just some sort of a pneumatic or hydraulic or mechanical device, 15 being an "adder" also affected by an analog input signal from the block marked 54. But while in FIG. 1 (and 4) applied signal current to 21 was added mechanically (torquewise) to that in 20 (though if the value of either was high it could by itself co-operate with the threshold setting), in FIG. 7 a modification is shown where the same end result is achieved (in block 55), for example, by putting the applied signal current in series with the current from the charge storage source 13 and then applying the sum of the two of them to the threshold device 15. In FIG. 7, a response curve shaping network (e.g., like the delinearization circuit 48–52 of FIG. 4) may be interposed (e.g., included in network 55) before the threshold device. A relay coil and normally open contact (16, 19) or other amplifying (or non-amplifying) means may then be used for readout or other utilization of the output signaling.

While we have illustrated and described particular embodiments, various modifications may obviously be made. Thus instead of a meter relay there might be a thyratron, a silicon controlled rectifier, a Schmitt trigger, or a neon tube or double cylinder piston or other known device which conducts or controls when a threshold is exceeded, and instead of a capacitor for storage there might be a magnetic core, or a hydraulic bellows. Such devices are all known to those familiar with the art and such substitutions, therefor, might be made without exceeding the true spirit and scope of the invention which we intend to have defined only by the appended claims taken with all reasonable equivalents.

We claim:

1. In time delay apparatus of the type having time delay adjustable electrically, the combination of,
a relatively constant D.C. voltage supply, a first controlling circuit comprising a switch, a series charging resistor, and a shunt capacitor all arranged with respect to said supply so that the switch determines time delay cycle starting time, the resistor limits flow of current from supply to capacitor and the capacitor receives a charge through the resistor, a second, separate, and externally energized controlling circuit, threshold conduction means connected and arranged to complete a circuit responsive to the cumulative effect of any and all of (1) said first controlling circuit before threshold conduction has occurred, (2) said second controlling circuit before threshold conduction has secured, and (3) a threshold, and switching means connected in the circuit completed by the threshold conduction means, said switching means being interconnected to discharge said capacitor and to provide an output signal at the end of a time delay determined by the first mentioned switch and resistor-capacitor circuit, the second controlling circuit, and the particular threshold.

2. The combination of claim 1 further characterized by there being a non-linear continuous function conduction circuit interposed between threshold conduction means and at least one of said first and second controlling circuits.

3. The combination as in claim 1 further characterized by the threshold conduction means comprising a meter relay having a manually adjustable contact, and for mating therewith a relatively movable contact, and a pair of coils for moving the movable contact, one of said coils being connected to be energized before contact closing by the first controlling circuit and the other of said coils being connected to be energized by the second controlling circuit before contact closing while the meter relay contacts upon mating serve to complete the circuit which energizes the switching means.

4. In time delay apparatus for use with a source of supply, means for starting an input from said source, a storage means connected to receive a charge from said starting means for starting the input, a source of signal, a threshold signaling device, a continuous function de-linearization circuit means interposed to affect the cumulative effect of storage means and source of signal upon said threshold signaling device, means for deriving a final output signal from said threshold signaling device, and means for resetting the storage means with operation of said threshold signaling device.

References Cited by the Examiner

UNITED STATES PATENTS 2,576,371 11/51 Thompson et al. _____ 317—132 X
2,947,918 8/60 Hamilton _____ 317—141 X SAMUEL BERNSTEIN, *Primary Examiner*.